US005771775A

United States Patent [19]

Ota et al.

[11] Patent Number: 5,771,775

[45] Date of Patent: Jun. 30, 1998

[54] DEVICE FOR GUIDING A PISTON

[75] Inventors: Masaki Ota; Kazuya Kimura; Hiroaki Kayukawa, all of Kariya, Japan

[73] Assignee: Kabushiki Kaisha Toyoda Jidoshokki Seisakusho, Kariya, Japan

[21] Appl. No.: 909,045

[22] Filed: Aug. 11, 1997

[30] Foreign Application Priority Data

Aug. 9, 1996 [JP] Japan .................................... 8-211626

[51] Int. Cl.$^{6}$ ........................................................ F16J 15/18

[52] U.S. Cl. ........................ 92/165 PR; 92/71; 92/165 R; 417/269; 91/499; 74/60

[58] Field of Search .......................... 92/12.2, 71, 165 R, 92/165 PR; 417/269; 91/499; 74/60

[56] References Cited

U.S. PATENT DOCUMENTS

| | | | |
|---|---|---|---|
| 4,364,306 | 12/1982 | Hattori et al. | 92/71 |
| 5,490,767 | 2/1996 | Kanou et al. | 417/269 |
| 5,615,599 | 4/1997 | Terauchi | 92/165 PR |

FOREIGN PATENT DOCUMENTS

| | | |
|---|---|---|
| 0698735 | 2/1996 | European Pat. Off. . |

*Primary Examiner*—Thomas E. Denion

*Attorney, Agent, or Firm*—Brooks Haidt Haffner & Delahunty

[57] ABSTRACT

A compressor has a front housing, cylinder block and a rear housing. The housings and cylinder block are secured to one another by a plurality of bolts. A plurality of pistons reciprocally move in cylinder bores to compress gas. Each of said bolts has a shaft extending through the housings and the cylinder block. A cam plate is supported on a drive shaft for integral rotation therewith to convert the rotation of the drive shaft to reciprocal movement of a piston in the cylinder bore. The piston rotates about its axis in accordance with rotation force transmitted from the cam plate and abuts against the shaft of the bolt, which extends in close proximity to the piston. The rotating piston abuts against the shaft so that the rotation thereof is restricted. The shaft has a diameter greater than that of a threaded portion formed at an end of the bolt. Since the threaded portion is smaller, the threaded portion does no damage to the piston during assembly.

23 Claims, 3 Drawing Sheets

DEVICE FOR GUIDING A PISTON

BACKGROUND OF THE INVENTION

1. Field of the Invention

The present invention relates to a device for guiding pistons, more particularly bolts for optimizing the movement of pistons in a compressor that compresses refrigerant gas by reciprocating the piston.

2. Description of the Related Art

The housing of a piston type compressor includes a front housing, a cylinder block and a rear housing, which are secured to one another by bolts. Cylinder bores are defined in the cylinder block. Between the front housing and the cylinder block is a crank chamber. A rotary shaft is rotatably supported in the crank chamber. A swash plate is supported on and rotates integrally with the rotary shaft. Each cylinder bore accommodates a piston. Each piston is connected to the swash plate by means of shoes. Rotation of the rotary shaft is converted into linear reciprocation of the pistons by the swash plate. Refrigerant gas in the cylinder bores is compressed by the reciprocation.

In the above described compressor, the rotational force of the swash plate is transferred to the pistons by the shoes. The pistons tend to rotate about their axes. The rotation of the pistons causes the pistons to hit against the swash plate, which causes noise and vibration.

Japanese Unexamined Utility Model No. 6-25573 discloses a compressor having a structure for preventing pistons from rotating. As shown in FIG. 5, bolts 81 are located close to the sides of each piston 82. More specifically, the bolts 81 are located on a circle, or the rotation path, about the axis S of each piston 82. Abutment of each piston 82 against the corresponding bolts prevents rotation of the piston 82.

However, the publication does not disclose the optimum shape of the bolts 81. Each bolt 81 has a contact portion 83 against which the piston 82 abuts and a threaded portion 81*a* that is screwed into the housing 84 of the compressor. Forming the portions 83, 81*a* with the same diameter causes the following drawbacks. Inserting each bolt 81 for assembling the housing causes the threaded portion 81*a* to pass through a part close to the piston 82. The threaded portion 81*a* is apt to contact the piston 82. The threaded portion 81*a* may damage the piston 82 by cutting away part of the piston 82. If the piston 82 is so damaged when the housing is assembled, the shavings of the piston 82 remain in the housing and settle into cracks between parts of the compressor.

In order to avoid the above problem, the clearance between the contact portion 83 of the bolt 81 and the piston 82 needs to be enlarged. However, a larger clearance increases the range of the piston's rotation. This increases the noise and the vibration generated when the piston 82 hits the bolt 81.

SUMMARY OF THE INVENTION

Accordingly, it is a main objective of the present invention to provide a structure that effectively optimizes movement of pistons in a compressor while ensuring smooth operation of the compressor.

It is another objective of the present invention to provide a structure for optimizing movement of pistons in a compressor, which structure reduces noise and vibration of the compressor.

It is yet another objective of the present invention to provide a structure for optimizing movement of pistons in a compressor, which structure keeps parts of the compressor undamaged during the assembly of the compressor.

To achieve the foregoing and other objectives and in accordance with the purpose of the present invention, an improved structure for restricting rotation of pistons is disclosed.

According to one aspect of the present invention, a compressor has a front housing, cylinder block and a rear housing. The housings and cylinder block are secured to one another by a plurality of bolts. A plurality of pistons reciprocally move in cylinder bores to compress gas. Each of said bolts has a shaft extending through the housings and the cylinder block. A cam plate is supported on a drive shaft for integral rotation therewith to convert the rotation of the drive shaft to reciprocal movement of a piston in the cylinder bore. The piston rotates about its axis in accordance with force transmitted from the cam plate and abuts against the shaft of the bolt, which is located in close proximity to the piston. The rotating piston abuts against the shaft so that the rotation thereof is restricted by such abutment. The shaft has a diameter greater than that of a threaded portion that is formed at an end of the bolt.

According to another aspect of the present invention, a sleeve is fitted on the shaft. The sleeve has an outer diameter greater than that of the threaded portion.

Other aspects and advantages of the invention will become apparent from the following description, taken in conjunction with the accompanying drawings, illustrating by way of example the principals of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

Figure 1:
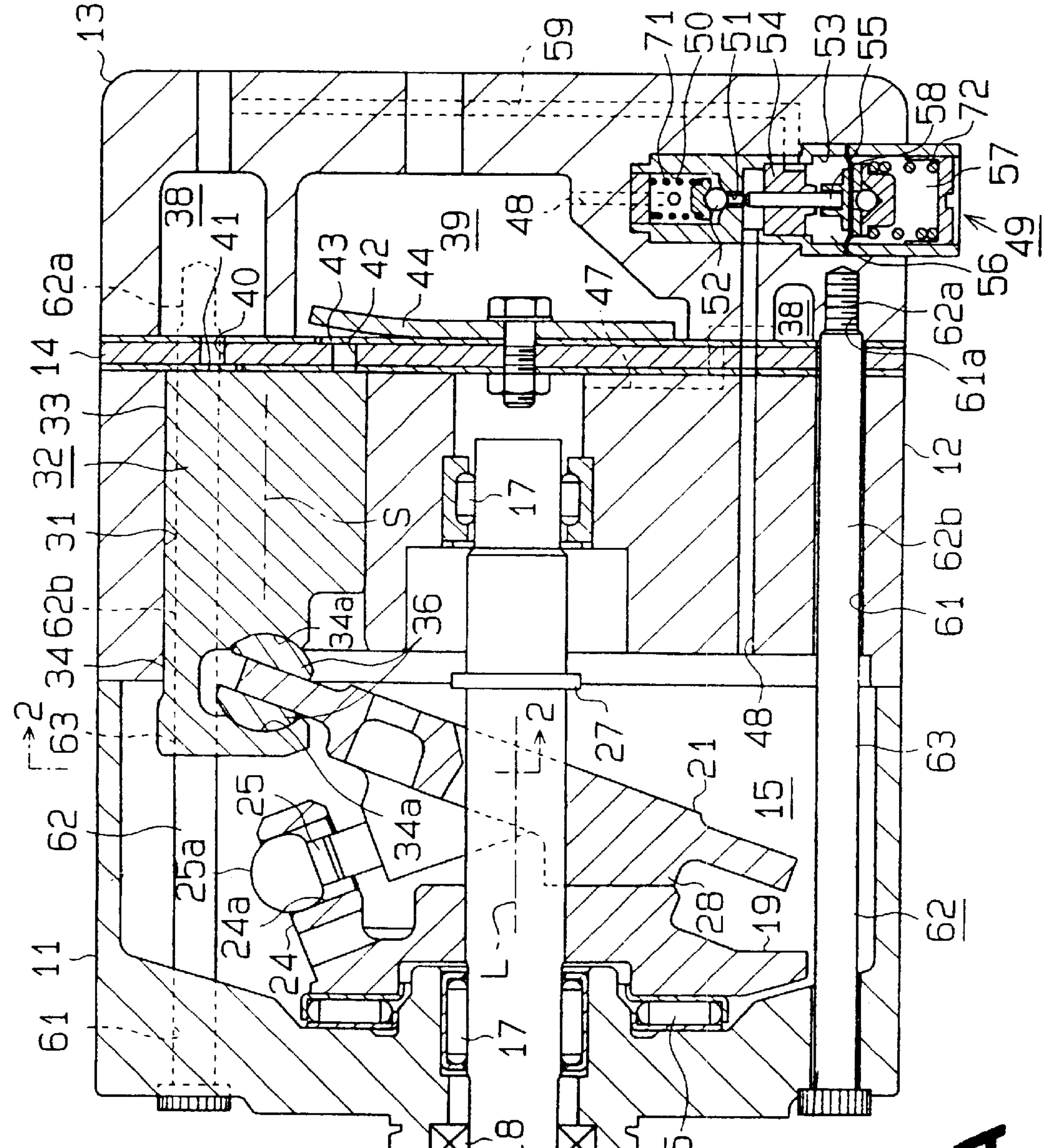
FIG. 1 is a cross-sectional view illustrating a variable displacement compressor of a single-headed piston type according to a first embodiment of the present invention.
Figure 2:
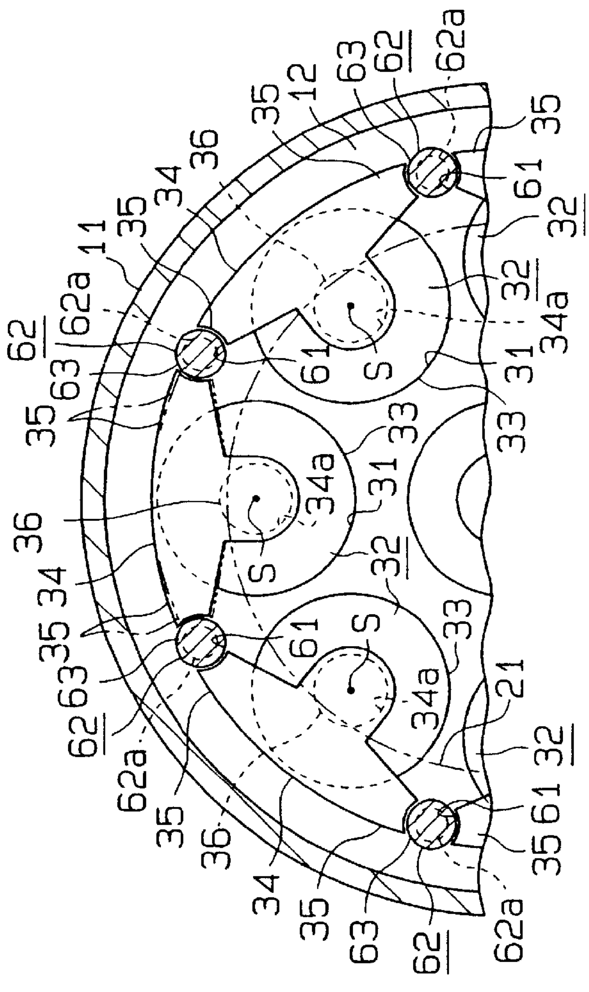
FIG. 2 is a cross-sectional view taken along line 2—2 of FIG. 1 with the swash plate removed.

As shown in FIGS. 1 and 2, the housing of the compressor includes a front housing 11, cylinder block 12 and the rear housing 13. The front housing 11 is arranged on the front end face of the cylinder block 12, while the rear housing 14 is arranged on the rear end face of the cylinder block 12 with a valve plate 14 in between. A plurality of through holes 61 are defined in the front housing 11, the cylinder block 12, the valve plate 14. Each hole 61 extends from the front end face of the front housing to a threaded hole 61*a* formed in the front end portion of the rear housing 13. The holes 61 are spaced equally apart from one another along a circle in the peripheral portion of the parts 11 to 14. A bolt 62 having a threaded portion 62*a* formed on its distal end is inserted in each hole 61 from the front housing 11. Each threaded portion 62*a* is then screwed into the corresponding threaded hole 61*a*. In this manner, the front housing 11 and the rear housing 13 are secured to opposite ends of the cylinder block 12 by the bolts 62.

A crank chamber 15 is defined by the inner walls of the front housing 11 and the front end face of the cylinder block 12. A rotary shaft 16 is rotatably supported in the front housing 11 and the cylinder block 12 by radial bearings 17. The shaft 16 is coupled to a vehicle engine by a clutch mechanism such as an electromagnetic clutch. When the engine is running, the clutch operably connects the shaft 16 with the engine thereby rotating the shaft 16.

A lip seal 18 is located between the rotary shaft 16 and the front housing 11 for sealing the crank chamber 15 from the outside of the compressor.

A lug plate 19 is fixed to the rotary shaft 16 in the crank chamber 15. A swash plate 21 is supported by the rotary shaft 16 in the crank chamber 15 to be slidable along and tiltable with respect to the axis L of the shaft 16. The lug plate 19 has a support arm 24 protruding from the peripheral portion of its rear end face. A pair of guide holes 24*a* are formed in the support arm 24. The arm 24 constitutes a part of a hinge mechanism. The swash plate 21 is provided with a pair of guiding pins 25 protruding from its front end face. Each pin 25 has a guide ball 25*a* at the distal end. The guiding pins 25 also constitute a part of the hinge mechanism. The guide ball 25*a* is slidably fitted into the corresponding guide hole 24*a*.

The cooperation of the arm 24 and the guiding pins 25 permits the swash plate 21 to tilt with respect to the axis L of the rotary shaft 16 and to rotate integrally with the rotary shaft 16. The tilting motion of the swash plate 21 is guided by the sliding motion between the guide holes 24*a* and the guide balls 25*a*, and by sliding motion of the swash plate 21 on the shaft 16. As the center portion of the swash plate 21 moves toward the cylinder block 12, the inclination of the swash plate 21 decreases.

An annular stopper 27 is fitted on the rotary shaft 16 between the lug plate 19 and the cylinder block 12. The abutment of the swash plate 21 against the stopper 27 prevents the inclination of the swash plate 21 from being smaller than the predetermined minimum inclination. The swash plate 21 is also provided with a projection 28 that is integrally formed on the front end face. The abutment of the projection 28 against the rear end face of the lug plate prevents the inclination of the swash plate 21 from being greater than the predetermined maximum inclination.

A plurality of cylinder bores 31 extend through the cylinder block 12. The axes of the cylinder bores 31 extend parallel to the axis L of the rotary shaft 16 and are spaced apart at equal intervals about the axis L. The outer periphery of the cylinder bores 31 are alternately arranged with the through holes 61. A single-headed piston 32 is accommodated in each cylinder bore 31. Each piston 32 includes a cylindrical portion 33 and a coupler portion 34 integrally formed on the front end (the end connected to the swash plate 21) of the cylindrical portion 33. Each cylindrical portion 33 is inserted in the corresponding cylinder bore 31 and each coupler portion 34 has a shoe seat 34*a* defined therein. The coupler portion 34 is also provided with a pair of restricters 35 formed on both sides. The restricters 35 extend outwardly from the periphery of the cylindrical portion 33. The swash plate 21 is coupled to the coupler portion 34 of each piston 32 by a pair of shoes 36 received by the shoe seat 34*a*. The rotating movement of the swash plate 21 is transmitted to each piston 32 through the shoes 36 and is converted into linear reciprocating movement of each piston 32 in the associated cylinder bore 31.

A suction chamber 38 and a discharge chamber 39 are defined in the rear housing 13. Suction ports 40 and discharge ports 42 are formed in the valve plate 14. Suction valve flaps 41 are formed on the valve plate 14. Each suction valve flap 41 corresponds to one of the suction ports 40. Discharge valve flaps 43 are formed on the valve plate 14. Each discharge valve flap 43 corresponds to one of the discharge ports 42. As each piston 32 moves from the top dead center to the bottom dead center in the associated cylinder bore 31, refrigerant gas in the suction chamber 38 is drawn into each cylinder bore 31 through the associated suction port 40 while causing the associated suction valve flap 41 to flex to an open position. As each piston 32 moves from the bottom dead center to the top dead center in the associated cylinder bore 31, refrigerant gas is discharged to the discharge chamber 39 through the associated discharge port 42 while causing the associated discharge valve flap 43 to flex to an open position. A retainer 44 is secured on the valve plate 14. The opening amount of each discharge valve flap 43 is defined by contact between the valve flap 43 and the retainer 44.

A thrust bearing 45 is located between the front housing 11 and the lug plate 19. The thrust bearing 45 carries the reactive force of gas compression acting on the lug plate 19 through the pistons 32 and the swash plate 21.

The crank chamber 15 is communicated with the suction chamber 38 by a pressure release passage 47, and the discharge chamber 39 is communicated with the crank chamber 15 by a supply passage 48. A displacement control valve 49 is accommodated in the rear housing 13 in the supply passage 48. The valve 49 includes a valve chamber 50. The chamber 50 constitutes a part of the passage 48. A port 51 is formed in the valve chamber 50. A valve body 52 is accommodated in the chamber 50 for opening and closing the port 51. A diaphragm chamber 53 is separated from the valve chamber 50 by a rod guide 54. The chamber 53 is divided into the pressure sensing chamber 56 and an atmospheric chamber 57 by a diaphragm 55. The atmospheric chamber 57 is communicated with the atmosphere. A rod 58 is slidably supported by the rod guide 54 and couples the valve body 52 with the diaphragm 55. The pressure sensing chamber 56 is communicated with the suction chamber 38 by a pressure sensing passage 59. Therefore, refrigerant gas in the suction chamber 38 is drawn into the pressure sensing chamber 56 through the passage 59. The diaphragm 55 is thus displaced by changes in the suction pressure. The opening of the port 51, or the opening of the supply passage 48 is changed, accordingly. This varies the pressure in the crank chamber 15, which changes the difference between the pressure in the crank chamber 15 acting on the front face of each piston 32 and the pressure in the cylinder bores 31 acting on the rear face of the piston 32. The inclination of the swash plate 21 is changed accordingly. This changes the stroke of each piston 32 so that the displacement of the compressor is varied.

If cooling load is great, the suction pressure is higher than a set value. The control valve 49 decreases the opening of the supply passage 48, accordingly. Refrigerant gas in the crank chamber 15 is released to the suction chamber 38 via the pressure release passage 47, and the pressure in the crank chamber 15 is lowered. This maximizes the inclination of the swash plate 21 thereby increasing the stroke of the pistons 32. The displacement of the compressor is increased accordingly, and this lowers the suction pressure.

If the cooling load is small, the suction pressure is lower than the set value. The control valve 49 thus enlarges the opening of the supply passage 48. Refrigerant gas in the discharge chamber 39 flows into the crank chamber 15 via the supply passage 48, and the pressure in the crank chamber 15 is increased. This minimizes the inclination of the swash plate 21 thereby decreasing the stroke of the pistons 32. The displacement of the compressor is decreased accordingly. This raises the suction pressure.

In this manner, the control valve 49 changes the inclination of the swash plate 21 for varying the displacement of the compressor thereby maintaining the set value of the suction pressure. The set value of the suction pressure is determined by the force of a spring 71, which urges the valve body 52 toward the port 51, and the force of a spring 72, which urges the diaphragm 55 against the spring 71.

A shaft portion 62*b* of each bolt 62 extends through the hole 61 between each adjacent pair of restricters 35. A range of the shaft portion 62*b* that corresponds to the location of the reciprocating restricters 35 functions as a contact portion 63. The clearance between the contact portion 63 and the corresponding restricters 35 is set as narrow as possible. In this preferred embodiment, the contact portions 63 have a larger diameter than the threaded portion 62*a*.

As shown in FIG. 2, the contact portions 63 are located in the path of each restricter 35 illustrated by two-chain dot lines. Therefore, rotation of the piston 32 in either direction about its axis S is limited by abutment of the restricters 35 and the contact portions 63. This prevents the pistons 32 from contacting the swash plate 21 thereby reducing noise and vibration.

Further, the pistons 35 receive the rotational force of the swash plate 22 and the reactive force of gas compression through the swash plate 22. Since the vectors of these forces are not aligned with the axes of the pistons 35, the forces act to tilt the pistons 35 relative to the axes S of the pistons 35. However, the tilting motion of the pistons 35 is restricted by abutment of the restricters 35 and the contact portions 63. This allows the pistons 35 reciprocate without being tilted by the forces.

The diameter of the contact portion 63 is larger than the threaded portion 62*a*. Therefore, setting the clearance between the contact portion 63 and the restricter 35 of each piston 32 as narrow as possible does not cause the threaded portion 62*a* to pass close to the restricter 35 when inserting the bolt 62 from the front housing 11 for assembling the housings 11 to 13. That is, the clearance between the threaded portion 62*a* and the restricter 35 is at least as large as the difference between the radius of the contact portion 63 and that of the threaded portion 62*a*. Thus, when assembling the housing components 11 to 13, the threaded portion 62*a* does not contact the piston 32. In other words, the piston 32 is not damaged, or shaved by the threaded portion 62*a*. The structure allows the clearance between the restricters 35 and the contact portion 63 to be as narrow as possible thereby minimizing the rotation of each piston 32. This reduces noise and vibration caused by hitting of the pistons 32 against the bolts 62.

Further, as illustrated in the enlarged circle view of FIG. 1, a coating C of resin having a low frictional resistance and a high wear resistance such as polytetrafluoroethylene (PTFE) is applied on the contact portion 63. Therefore, sliding motion of the restricter 35 on the contact portion 63 does not hinder the reciprocation of the pistons 32. The coating C also improves the durability of the bolts 62.

The contact portion 63 is integrally formed with the bolt 62 by enlarging the diameter of the shaft portion 62*b*. Thus, the structure for prevention rotation of the pistons 32 according to the preferred embodiment does not increase the number of parts of the compressor. This reduces the number of the manufacturing steps and lowers the manufacturing cost of the compressor.

Figure 3:
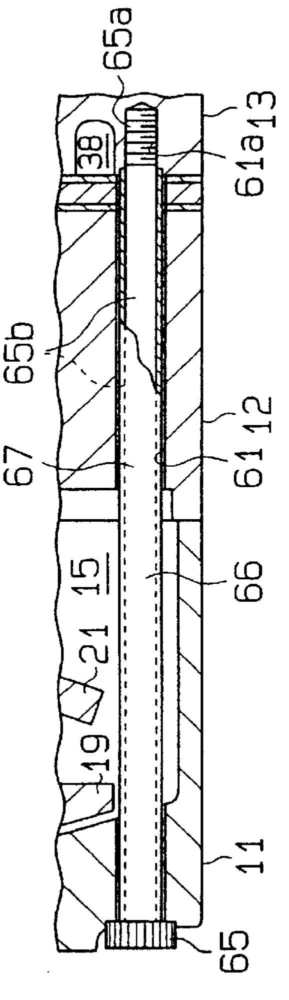
FIG. 3 is an enlarged partial cross-sectional view illustrating a compressor according to another embodiment.
Figure 5:
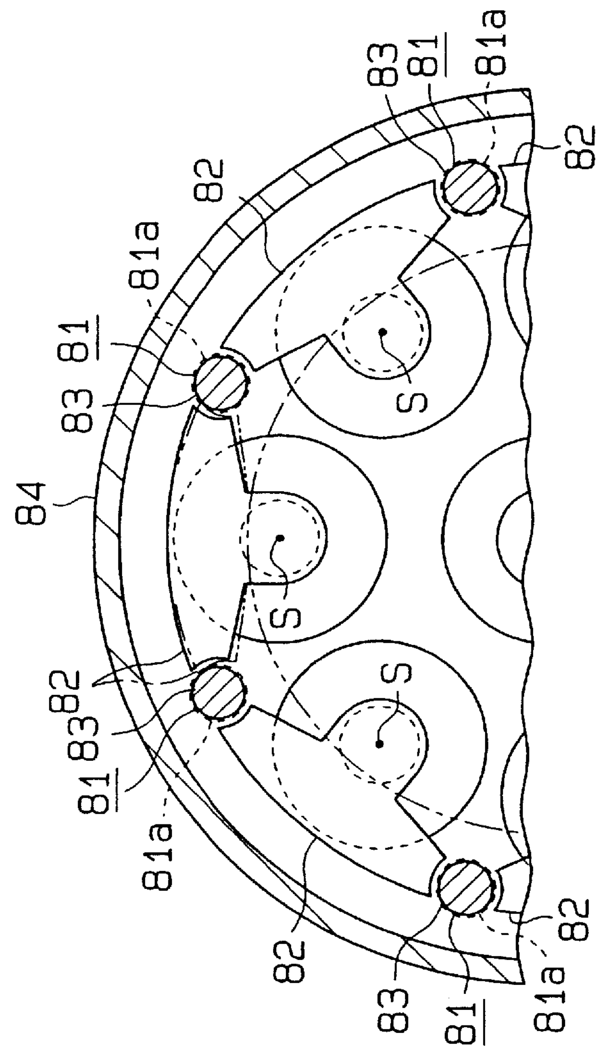
Fig.5 (Prior Art)
FIG. 5 is an enlarged partial cross-sectional view illustrating a prior art compressor.

A second embodiment of the present invention will now be described with reference to FIG. 3.

In this embodiment, a contact portion 66 is formed separately from a bolt 65. Specifically, a hollow cylindrical sleeve 67 is fitted about a shaft portion 65*b* of the bolt 65 such that the diameter of the contact portion 66 is larger than the diameter of the threaded portion 65*a*. Part of the sleeve 67 that contacts the restricters 35 functions as the contact portion 66. This structure allows conventional bolts 65 to be used without any alteration thereby eliminating the necessity for forming specially designed bolts. The sleeve 67 facilitates application of the low friction resistance coating C on the surface of the contact portion 66, on which the piston 32 slides when reciprocating. Since the coating C should not be applied on the threaded portion 62*a,* the threaded portion 62*a* must be masked when applying the coating C on the contact portion 63 if the contact portion 63 is formed integrally with the bolt 62. However, the sleeve 67 can be coated without masking since it is a separate part.

Although only two embodiments of the present invention have been described herein, it should be apparent to those skilled in the art that the present invention may be embodied in many other specific forms without departing from the spirit or scope of the invention. Particularly, it should be understood that the invention may be embodied in the following forms.

(1) The present invention may be adopted to double-headed piston type compressors and to compressors having a cam other than the swash plate 21 such as a wave cam.

(2) The present invention may be adopted to piston type compressors of a clutchless type, which have no electromagnetic clutch.

Figure 4:
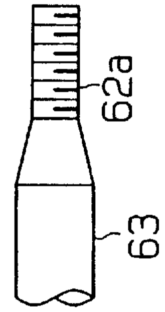
FIG. 4 is a partial side view illustrating a distal end portion of a bolt according to yet another embodiment.

(3) As shown in FIG. 4, the diameter of the bolt may gradually increase from the threaded portion to the contact portion. This structure further facilitates the insertion of the bolt.

Therefore, the present examples and embodiments are to be considered as illustrative and not restrictive and the invention is not to be limited to the details given herein, but may be modified within the scope and equivalence of the appended claims.

What is claimed is:

1. A device for guiding a piston including bolt means for restricting rotation of the piston in a compressor, the compressor having a plurality of housing segments secured to one another by the bolt means to form a housing, the housing including a cylinder bore, wherein said piston reciprocally moves in the cylinder bore to compress gas, wherein said bolt means comprises:

a contacting portion extending through at least two of the housing segments, wherein said piston abuts against the contacting portion when the piston rotates and wherein the rotation of the piston is restricted by such abutment;

a threaded portion to thread into at least one of the housing segments, wherein said contacting portion has a diameter greater than that of the threaded portion.

2. The bolt means as set forth in claim 1, wherein said contacting portion is integrally formed with the threaded portion.

3. The bolt means as set forth in claim 2, wherein said contacting portion is coated by a synthetic resin that has a low frictional resistance and a high wear resistance.

4. The bolt means as set forth in claim 1, wherein said contacting portion is assembled to the threaded portion.

5. The bolt means as set forth in claim 4, wherein said bolt means includes:

a bolt body having the threaded portion at least at its end; and a sleeve, which forms the contacting portion, fitted to the bolt body.

6. The bolt means as set forth in claim 5, wherein said sleeve covers the majority of the bolt body.

7. The bolt means as set forth in claim 6, wherein said contacting portion is coated with a synthetic resin that has a low frictional resistance and a high wear resistance.

8. The bolt means as set forth in claim 1 further comprising:

a drive shaft rotatably supported in the housing; and a cam plate supported on the drive shaft for integral rotation with the drive shaft to convert the rotation of the drive shaft to reciprocal movement of the piston, whereby the cam plate transmits force to the piston causing the piston to rotate and abut against the bolt means.

9. The bolt means as set forth in claim 8, wherein said bolt has a diameter gradually increasing from the threaded portion to the contacting portion.

10. A device for guiding a piston for compressor including a housing bolt for housing the compressor, the compressor including a front housing, a cylinder block and a rear housing, said housings and cylinder block being secured to one another by the bolt, said front housing and cylinder block defining a crank chamber therebetween, said cylinder block including a cylinder bore, wherein a cam plate is supported on a drive shaft for integral rotation therewith in the crank chamber to convert rotation of the drive shaft to reciprocal movement of a piston in the cylinder bore, whereby the piston rotates about its axis in accordance with force transmitted from the cam plate and abuts against the bolt, which is located in close proximity to the piston, wherein said bolt comprises:

a contacting portion extending through the crank chamber, wherein said piston abuts against the bolt to restrict rotation of the piston;

a threaded portion formed at an end of the bolt to be threaded into at least one of the housings, wherein said contacting portion has a diameter greater than that of the threaded portion.

11. The housing bolt as set forth in claim 10, wherein said contacting portion extends through the crank chamber in close proximity to the piston.

12. The housing bolt as set forth in claim 11, wherein said contacting portion has means for reducing wear between the piston and the contacting portion when the piston abuts against the contacting portion.

13. The housing bolt as set forth in claim 12, wherein said wear reducing means includes a coating of a synthetic resin that has a low frictional resistance and a high wear resistance.

14. The bolt means as set forth in claim 13, wherein said bolt has a diameter gradually increasing from the threaded portion to the contacting portion.

15. A device for guiding a piston for the compressor including a housing bolt assembly, the compressor including a front housing, a cylinder block and a rear housing, said housings and cylinder block being secured together by the bolt, said front housing and the cylinder block defining a crank chamber therebetween, said cylinder block including a cylinder bore, wherein a cam plate is supported on a drive shaft for integral rotation therewith in the crank chamber to convert rotation of the drive shaft to reciprocal movement of a piston in the cylinder bore, whereby the piston rotates about its axis in accordance with force transmitted from the cam plate and abuts against the bolt, wherein said bolt assembly comprises:

a threaded portion for fastening the housings and the cylinder block together;

a body portion extending through at least the crank chamber; and a sleeve fitted on the body portion to be abutted by the piston when the piston rotates, said sleeve having an outer diameter greater than that of the threaded portion.

16. The housing bolt assembly as set forth in claim 15, wherein said sleeve has means for reducing wear between the piston and the sleeve when the piston abuts against the sleeve.

17. The housing bolt as set forth in claim 16, wherein said wear reducing means includes a coating of a synthetic resin that has a low frictional resistance and a high wear resistance.

18. The bolt means as set forth in claim 17, wherein said bolt has a diameter gradually increasing from the threaded portion to the contacting portion.

19. A compressor including a housing bolt for housing the compressor, the compressor including a front housing, a cylinder block and a rear housing, said housings and cylinder block being secured to one another by the bolt, said front housing and cylinder block defining a crank chamber therebetween, said cylinder block including a cylinder bore, wherein a cam plate is supported on a drive shaft for integral rotation therewith in the crank chamber to convert rotation of the drive shaft to reciprocal movement of a piston in the cylinder bore, whereby the piston rotates about its axis in accordance with force transmitted from the cam plate and abuts against the bolt, which is located in close proximity to the piston, said compressor comprising:

a contacting portion extending through the crank chamber, wherein said piston abuts against the bolt to restrict rotation of the piston;

a threaded portion formed at an end of the bolt to be threaded into at least one of the housings, wherein said contacting portion has a diameter greater than that of the threaded portion.

20. The compressor as set forth in claim 19, wherein said contacting portion extends through the crank chamber in close proximity to the piston.

21. The compressor as set forth in claim 20, wherein said contacting portion has means for reducing wear between the piston and the contacting portion when the piston abuts against the contacting portion.

22. The compressor as set forth in claim 21, wherein said wear reducing means includes a coating of a synthetic resin that has a low frictional resistance and a high wear resistance.

23. The compressor as set forth in claim 22, wherein said bolt has a diameter gradually increasing from the threaded portion to the contacting portion.

* * * * *

UNITED STATES PATENT AND TRADEMARK OFFICE
CERTIFICATE OF CORRECTION

PATENT NO. : 5,771,775

DATED : June 30, 1998

INVENTOR(S) : Masaki Ota et al

It is certified that error appears in the above-identified patent and that said Letters Patent is hereby corrected as shown below:

<u>In the Claims:</u>

Figure 1A:
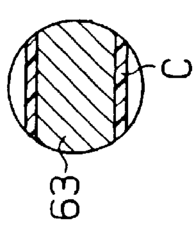

Column 2, between lines 40 and 41, insert the following paragraph:

--Fig. 1A is an encircled and enlarged fragmentary cross sectional showing of a contact portion of an attachment bolt in the compressor;--.

Column 5, line 37, after "35", insert –to–;
line 58, after "1" and before "," (comma), insert "A".

Signed and Sealed this

Nineteenth Day of January, 1999

*Attest:*

*Attesting Officer*

*Acting Commissioner of Patents and Trademarks*